Nov. 9, 1954
J. R. HAMM
2,693,676
COMBUSTION APPARATUS WITH MULTIPLE-OUTLET
FUEL VAPORIZING TUBES
Filed June 11, 1951
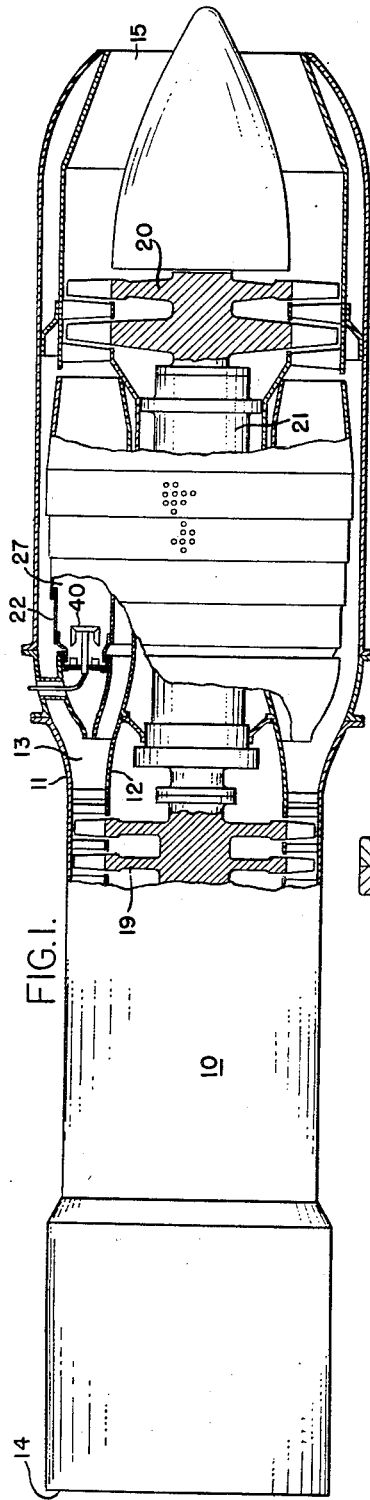
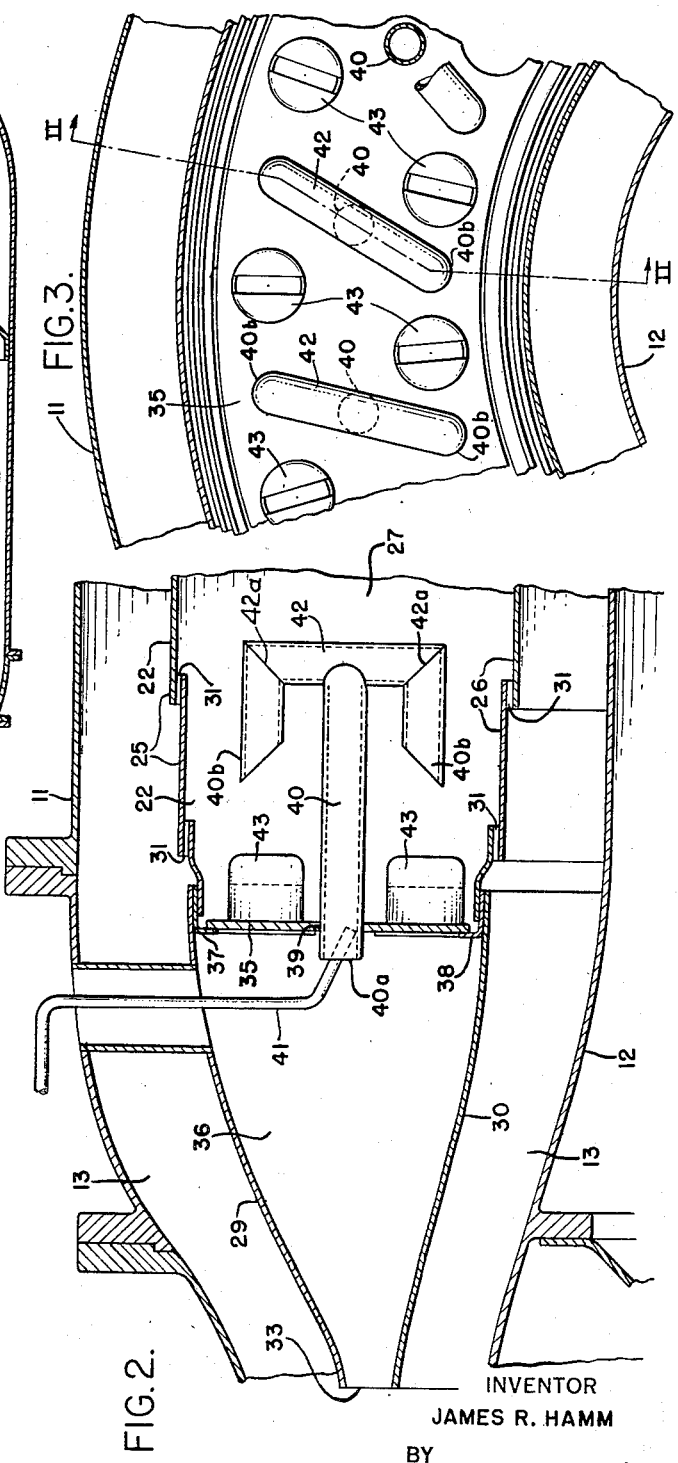
INVENTOR
JAMES R. HAMM
BY
Robert T. French
ATTORNEY

United States Patent Office 2,693,676
Patented Nov. 9, 1954

2,693,676

COMBUSTION APPARATUS WITH MULTIPLE-OUTLET FUEL VAPORIZING TUBES

James R. Hamm, Moylan, Pa., assignor to Westinghouse Electric Corporation, East Pittsburgh, Pa., a corporation of Pennsylvania Application June 11, 1951, Serial No. 230,977

3 Claims. (Cl. 60—39.71)

This invention relates to combustion apparatus and more particularly to a combustion chamber of the fuel vaporizing type adapted to be employed in aviation power plant equipment.

It has been proposed to provide combustion apparatus, for aviation turbojet engines and the like, in which fuel is supplied to the combustion chamber by way of a plurality of individual vaporizing tubes extending axially into the chamber, each of which has an upstream inlet for receiving fuel and primary air under pressure and a retrorse or reentrant downstream outlet through which the fuel in vaporized from is admixed with air and supplied into the combustion zone. One object of the present invention is to provide an apparatus of this type, wherein the elements are constructed and arranged to minimize weight and complexity of the fuel system.

Another object of the invention is the provision of improved fluid fuel vaporizing combustion apparatus having a relative small number of separate vaporizing components, each having a common inlet communicating with multiple outlets.

These and other objects are effected by the invention as will be apparent from the following description and claims taken in connection with the accompanying drawing, forming a part of this application, in which:

Fig. 1 is a longitudinal diagrammatic view, partly in section, of a typical aviation gas turbine engine equipped with combustion apparatus which embodies the invention;

Fig. 2 is a fragmentary, enlarged detail sectional view, taken along line II—II of Fig. 3, and showing a portion of the combustion apparatus shown in Fig. 1; and Fig. 3 is a fragmentary sectional plan view of a portion of the combustion apparatus shown in Fig. 1 viewed toward the upstream end.

Referring to Fig. 1 of the drawing, a typical gas turbine power plant 10, with which the invention is adapted to be associated in a suitable compartment of an aircraft (not shown), may comprise an outer generally cylindrical casing structure 11 having longitudinally mounted therein a core structure 12, forming an annular passageway generally indicated at 13, which constitutes a fluid flow communication extending through the plant from a forwardly directed air inlet opening 14 to a rearwardly disposed exhaust nozzle 15. The usual operating components of the power plant 10 are arranged in axial alignment therein, and include an axial flow compressor 19, a driving turbine 20 connected thereto by means of a shaft 21, and annular combustion apparatus 22, which is interposed in the passage 13 between the discharge end of the compressor and the inlet of the turbine. In operation, air entering the inlet opening 14 is compressed by the compressor 19 and delivered through passage 13 to the combustion apparatus 22. Fuel supplied to the combustion apparatus, by way of suitable means hereinafter more fully described, is burned in the stream of air under pressure, creating motive gases which are expanded through the turbine 20 and finally discharged to atmosphere through the nozzle 15, establishing a propulsive thrust.

The combustion apparatus 22 embodying the invention is preferably annular in form, although the features of the invention are readily adapted to be employed in combustion apparatus of the multiple unit or cell type. According to the invention, as best illustrated in Fig. 2, the combustion apparatus 22 comprises a burner structure having outer and inner sectional annular walls 25 and 26, which form a generally diverging combustion chamber 27. The outer wall 25 may consist of an assembly of a number of overlapped sections or rings, including a curved forward section 29, while the inner wall 26 may likewise constitute an assembly including a forward section 30, which is concentric with the outer section 29. Suitable inlets 31 for secondary air may be formed in the walls 25 and 26, by means of spacers interposed between the overlapping portions of the assembled sections. The forward wall sections 29 and 30 are imperforate and may be supported on radially disposed struts (not shown) extending between the inner and outer casings 12 and 11. The upstream portions of the forwardly disposed wall sections 29 and 30 are inswept to form a relatively narrow annular primary air entryway 33.

An annular baffle or header 35 is transversely disposed between the downstream portions of the wall sections 29 and 30 and may be secured thereto in any suitable manner, such as by means of annular angle members 37 and 38 welded to the respective sections. The baffle 35 thus separates the combustion chamber 27 from a diffuser space 36 defined between sections 29 and 30 and communicating with the passage 13 by way of entryway 33.

A plurality of axially extending vaporizer tube members 40 are supported in suitable apertures 39 formed in the baffle 35. According to the invention, the inlet ends 40a of the tube members project slightly into the diffuser space 36 and the major portions thereof extend into the combustion chamber 27 and terminate in diverging, multiple retrorse branches or discharge ends 40b. In the drawing, each tube member 40 is provided with a pair of oppositely extending discharge ends 40b, although if preferred, a greater number of discharge ends might be provided. Suitable fuel supply means, including fuel conduits 41, may be provided for delivering fuel at a controlled rate of flow into the inlet ends 40a of the respective tube members, such fuel being adapted to be propelled through the tube members by the stream of air flowing therethrough from the diffuser space 36 and issuing in counterflow relation into the combustion chamber 27. It will be noted, as best shown in Fig. 2, that the reentrant ends 40b are preferably disposed parallel to the portion of each tube member 40 having the inlet end 40a, and extend normal to a T portion 42 carried by the member downstream of the inlet end, so that angular bends are provided at points 42a to facilitate mixture of the fuel and primary air.

Each of the tubes 40 is associated with one or more of a plurality of spaced turbulence promoter ducts or slit-type nozzles 43, which are mounted on the baffle 35 for admitting primary air to the combustion chamber 27 adjacent or near the point at which substantially vaporized fuel is discharged in a counterflow direction by way of the fuel vaporizer tube members 40.

It will be understood that the combustion process prevailing in the combustion chamber 27 will at all times ensure sufficient pressure drop to maintain flow of air thereto from the diffuser space 36, in which some of the velocity of the air flowing through the entryway 33 is converted to pressure in the usual manner. Primary air flows axially through each of the vaporizer tube members 40, picking up and facilitating vaporization of fuel admitted by way of the conduits 41, the resultant mixture being then diverted into opposite flow paths within T portion 42 and finally discharged in counterflow relation by way of the reentrant ends 40b. In operation of the combustion apparatus, the flow pattern of other air entering the combustion chamber through the plurality of ducts 43 will then promote further rapid mixing of air and vaporized fuel, consequently improving the flame propagation velocity characteristics of the combustion reaction in chamber 27.

While the invention has been shown in but one form, it will be obvious to those skilled in the art that it is not so limited, but is susceptible of various other changes and modifications without departing from the spirit thereof.

What is claimed is:
1. Combustion apparatus comprising casing structure forming a passageway through which air under pressure is propelled at high velocity, burner shell structure interposed in said passageway and including an upstream wall, said shell structure forming a combustion chamber and having apertures formed therein and in said upstream wall, a vaporizing tube member having an inlet end received in one of said apertures, said tube being disposed in said combustion chamber parallel to the path of gas flow therethrough, said tube member having at least two diverging retrorse open outlet end portions for discharging fluid into said combustion chamber in counterflow relation to the main path of gas flow, said outlet end portions diverging at right angles relative to said tube member, and fuel supply means including a conduit having an outlet end communicating with said inlet end of said tube member.

2. Combustion apparatus comprising cylindrical casing structure forming an annular passageway through which air under pressure is propelled at high velocity, a unitary burner shell assembly disposed in said passageway and including spaced apertured outer and inner annular side walls and an upstream end wall forming a combustion chamber, said end wall having a plurality of openings formed therein, and a plurality of circumferentially spaced tube members disposed in said combustion chamber parallel to the path of gas flow therethrough, each of said tube members having an open inlet end secured in one of said openings in said end wall and a T-shaped outlet end portion forming at least two branches diverging at right angles relative to said tube members and having right-angular retrorse open ends for discharging fuel and air into said combustion chamber in counterflow relation to the main gas flow path therein, and fuel supply means including conduits having outlets communicating with said inlet ends of each of said tube members.

3. A combustion chamber for an internal combustion turbine plant, for burning a high flash-point fluid fuel in the presence of air impelled at high velocity, including an elongated outer casing of substantially circular cross-section, an enlongated inner casing spaced radially therefrom for providing a combustion chamber, baffle means at one end of said combustion chamber having spaced apertures disposed in the high velocity air path, a plurality of reentrant multiple discharge tube members, each having a common main tubular inlet portion engaged in an aperture of said baffle means and a plurality of right-angularly diverging retrorse outlet branches with discharge openings directed toward places in said baffle means intermediate adjacent apertures therein, slit-type air nozzles mounted in said adjacent apertures, respectively, and means for injecting fluid fuel into said tubular inlet portion of each of said tube members.

References Cited in the file of this patent
UNITED STATES PATENTS

| Number | Name | Date |
|---|---|---|
| 2,522,081 | Allen | Sept. 12, 1950 |
| 2,541,900 | Williams | Feb. 13, 1951 |
| 2,552,851 | Gist | May 15, 1951 |
| 2,560,401 | Allen | July 10, 1951 |
| 2,595,765 | Clarke et al. | May 6, 1952 |